United States Patent
Lee et al.

(10) Patent No.: US 9,678,650 B2
(45) Date of Patent: Jun. 13, 2017

(54) METHOD AND DEVICE FOR CONTROLLING STREAMING OF MEDIA DATA

(75) Inventors: Seokhee Lee, Seoul (KR); Sungmok Shin, Seoul (KR); Myonggu Lee, Seoul (KR); Mikyung Kim, Seoul (KR); Sangho Choi, Seoul (KR); Seongpyo Hong, Seoul (KR); Sanghyuk Oh, Seoul (KR); Hyoungrae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 831 days.

(21) Appl. No.: 13/323,208

(22) Filed: Dec. 12, 2011

(65) Prior Publication Data

US 2012/0272149 A1    Oct. 25, 2012

(30) Foreign Application Priority Data

Apr. 22, 2011    (KR) ........................ 10-2011-0037843

(51) Int. Cl.
   G06F 3/0488    (2013.01)
   G06F 3/00    (2006.01)
   (Continued)

(52) U.S. Cl.
   CPC ........ G06F 3/0486 (2013.01); G06F 3/04883 (2013.01); H04L 65/4084 (2013.01);
   (Continued)

(58) Field of Classification Search
   CPC .............. G06F 3/0486; H04L 12/2812; H04L 41/0809; H04L 21/2812; H04N 21/43615
   (Continued)

(56) References Cited

U.S. PATENT DOCUMENTS 6,263,503 B1 *   7/2001   Margulis .................... 725/81
6,792,323 B2    9/2004   Krzyzanowski et al.
(Continued)

FOREIGN PATENT DOCUMENTS

KR   10-2006-0004912 A    1/2006
KR   10-2007-0040592 A    4/2007
(Continued)

*Primary Examiner* — Jeffrey A Gaffin
*Assistant Examiner* — Nhat-Huy T Nguyen
(74) *Attorney, Agent, or Firm* — Birch, Stewart, Kolasch & Birch, LLP

(57) ABSTRACT

According to an embodiment of the present invention, a method of controlling streaming media data using a streaming control device includes accessing, via the streaming control device, a plurality of media data stored in a media server, displaying, via a touchscreen of the streaming control device, a first object including the plurality of media data, receiving a first command selecting a particular media data among the plurality of media data from the first object, searching for media playback devices to reproduce the particular media data based on a position of the streaming control device, displaying, via the touchscreen, a third object for representing the searched media playback devices, receiving a second command selecting a particular media playback device among the searched media playback devices from the third object, and controlling the particular media playback device to reproduce the particular media data.

10 Claims, 20 Drawing Sheets

(51) Int. Cl.

| | |
|---|---|
| *G06F 3/0486* | (2013.01) |
| *G06F 3/023* | (2006.01) |
| *H04N 21/436* | (2011.01) |
| *H04L 29/06* | (2006.01) |
| *H04N 21/422* | (2011.01) |
| *H04N 21/431* | (2011.01) |
| *H04N 21/45* | (2011.01) |
| *H04N 21/4725* | (2011.01) |
| *H04N 21/482* | (2011.01) |

(52) U.S. Cl.
CPC ... *H04N 21/4222* (2013.01); *H04N 21/42208* (2013.01); *H04N 21/42224* (2013.01); *H04N 21/4316* (2013.01); *H04N 21/4524* (2013.01); *H04N 21/4725* (2013.01); *H04N 21/4821* (2013.01)

(58) Field of Classification Search
USPC .................... 700/224; 707/999; 715/716
See application file for complete search history.

(56) References Cited

U.S. PATENT DOCUMENTS

| | | | | |
|---|---|---|---|---|
| 7,155,305 | B2* | 12/2006 | Hayes et al. | 700/224 |
| 8,789,131 | B2* | 7/2014 | Choi | G06F 3/04883 725/148 |
| 2002/0109858 | A1* | 8/2002 | Bruce | 358/1.15 |
| 2006/0234765 | A1* | 10/2006 | Herberger | G11B 27/034 455/552.1 |
| 2006/0240862 | A1* | 10/2006 | Neven et al. | 455/550.1 |
| 2007/0100839 | A1* | 5/2007 | Kim et al. | 707/10 |
| 2008/0295012 | A1* | 11/2008 | Sloo | G06F 3/0486 715/769 |
| 2012/0154679 | A1* | 6/2012 | Pendarvis | H04N 21/4307 348/512 |

FOREIGN PATENT DOCUMENTS

| | | |
|---|---|---|
| KR | 10-2010-0054514 A | 5/2010 |
| KR | 10-2010-0127416 A | 12/2010 |

* cited by examiner

METHOD AND DEVICE FOR CONTROLLING STREAMING OF MEDIA DATA

Pursuant to 35 U.S.C. §119(a), this application claims the priority benefit of Korean Patent Application No. 10-2011-0037843 filed on Apr. 22, 2011, which is hereby incorporated by reference as if fully set forth herein.

BACKGROUND OF THE INVENTION

Field of the Invention

The present invention relates to a method and device for controlling streaming of media data, and in particular, to a method and device for controlling streaming of media data, which is able to provide a user interface for efficiently controlling a connection between a media server and a media playback device.

Discussion of the Related Art

Recently, various devices using techniques for efficiently sharing data between devices, which are required to provide home network services or communication-broadcasting converged services, have been released.

Digital Living Network Alliance (DLNA) is an organization for commercializing a home network, which aims at establishing compatible platforms based on already established industrial standards and realizing a convergence between industries. DLNA promotes an introduction of an industrial guideline based on Universal Plug and Play (UPnP) which is widely used by manufacturers of home appliances, personal computers (PC), wireless devices, etc.

A guideline which is currently introduced to DLNA provides design rules for sharing content between different brands and products over a wired or wireless home network among a home appliance, a PC and a wireless device. Accordingly, products designed according to the guideline may share content such as music, photos or video over a home network and the content may be stored in a media server in real time through streaming and played back using a media playback device.

However, in order to stream media content using a method such as DLNA, a user must perform a cumbersome operation for connecting a media server and a media playback device.

Accordingly, there is a need for a user interface (UI) method for intuitively and conveniently connecting a media server and a media playback device.

SUMMARY OF THE INVENTION

Accordingly, the present invention is directed to a method and device for controlling streaming of media data that substantially obviate one or more problems due to limitations and disadvantages of the related art.

An object of the present invention is to provide a method and device for controlling streaming of media data, which enables a user to more readily and conveniently utilize content between a media server and a media playback device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling streaming media data includes accessing a media server storing media data, displaying a first graphical user interface (GUI) object enabling a user to select the media data, receiving a first command of the user who selects the media data through the first GUI object, searching for a media playback device able to reproduce the media data according to the position of the user, displaying a second GUI object enabling the user to select the searched media playback device, receiving a second command of the user who selects the media playback device through the second GUI object, and playing the media data back using the media playback device.

The first command and the second command may be received by a user touch gesture of touching a touchscreen. The first command may be received by a user touch gesture of pushing the first GUI object for a long time. The second command may be received by a drag-and-drop gesture the first GUI object onto the second GUI object.

The media playback device may include a media data processing device for processing data included in the media data and a media output device for displaying and providing the data processed by the media data processing device to the user, and the second GUI object may represent the media output device.

The second GUI object may include a plurality of GUI objects representing a plurality of media playback devices able to reproduce the media data, and, in the displaying the second GUI object, the plurality of GUI objects may be arranged and displayed in correspondence with the relative positions of the plurality of media playback devices.

The media playback device may include a video output device for outputting video data included in the media data and an audio output device for outputting audio data included in the media data, in the displaying the first GUI object, a video data GUI object representing the video data and an audio data GUI object representing the audio data may be displayed, and, in the receiving the second command, the command of the user for outputting the video data and the audio data through the video output device and the audio output device may be received through the video data GUI object and the audio data GUI object.

In the displaying the second GUI object, the second GUI object may be displayed according to the position of the media playback device relative to the user.

The media playback device may include a plurality of media playback devices, and the plurality of media playback devices may be grouped into a plurality of groups defined by the user, and, in the displaying the second GUI object, a plurality of GUI objects respectively representing the plurality of groups may be displayed.

The searching for the media playback device may include identifying the media playback device by an image of the media playback device captured by a camera, and the second GUI object may be displayed as the image of the identified media playback device.

In another aspect of the present invention, a device for controlling streaming of media data includes a network interface configured to access a media server storing media data and search for a media playback device able to reproduce the media data according to the position of a user, a display unit configured to display a first GUI object for enabling the user to select the media data and a second GUI object enabling the user to select the searched media playback device, a user interface configured to receive a first command of the user who selects the media data through the first GUI object and receive a second command of the user who selects the media playback device through the second GUI object, and a controller configured to control the media server and the media playback device through the network interface to reproduce the media data using the media playback device according to the first command and second command of the user received from the user interface.

According to an embodiment, the present invention includes a method of controlling streaming media data using a streaming control device. The method includes accessing, via the streaming control device, a plurality of media data stored in a media server, displaying, via a touchscreen of the streaming control device, a first object including the plurality of media data, receiving a first command selecting a particular media data among the plurality of media data from the first object, searching for media playback devices to reproduce the particular media data based on a position of the streaming control device, displaying, via the touchscreen, a third object for representing the searched media playback devices, receiving a second command selecting a particular media playback device among the searched media playback devices from the third object, and controlling the particular media playback device to reproduce the particular media data.

According to an embodiment of the present invention, a device for controlling streaming of media data includes a network interface configured to access a media server that stores a plurality of media data and search for media playback devices to reproduce a particular media data selected from the plurality of media data according to a position of the device, a display unit configured to display a first object for selecting the particular media data and a third object for selecting a particular media playback device from the searched media playback devices, a user interface configured to receive a first command selecting the particular media data from the first object and receive a second command selecting the particular media playback device from the third object, and a controller configured to control the media server and the particular media playback device through the network interface to reproduce the particular media data using the particular media playback device according to the first command and second command received via the user interface.

It is to be understood that both the foregoing general description and the following detailed description of the present invention are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
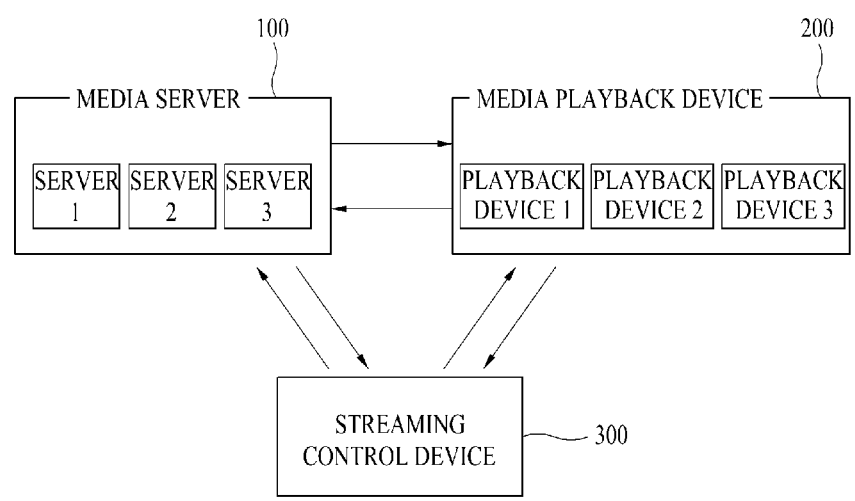
FIG. 1 is a schematic diagram showing a system for streaming media data according to an embodiment of the present invention.

Reference will now be made in detail to the preferred embodiments of the present invention, examples of which are illustrated in the accompanying drawings. FIG. 1 is a schematic diagram showing a system for streaming media data according to an embodiment of the present invention.

As shown, the system for streaming media data includes a media server 100 including at least one server for storing media data such as photos, music and moving images, a media playback device 200 including at least one playback device for playing media data back, and a media streaming control device 300 for controlling playback of the media data stored in the media server 100 using the media playback device 200.

Although the media server 100, the media playback device 200 and the media streaming control device 300 are shown as separate components in FIG. 1, these components are divided for convenience of description, the present invention is not limited thereto, and one device may perform functions of at least two of the above components. That is, the media server 100 and the media playback device 200, the media playback device 200 and the media streaming control device 300, or the media server 100 and the media streaming control device 300 may be implemented as one device.

The media streaming control device 300 may search for and connect the media server 100 and the media playback device 200 present in the same network using a predetermined multicast protocol. Further, the media streaming control device 300 may provide a Graphical User Interface (GUI) for media data stored in the media server 100. A user may readily select media data and a media playback device 100 which can reproduce the media data through the GUI provided by the media streaming control device 300.

Such a media streaming control device 300 may be composed of a mobile device including a touchscreen for providing a UI by a user's touch gesture. The media streaming control device 300 according to the embodiment of the present invention may provide a user interface by other UI means such as gesture or sound.

Figure 2:
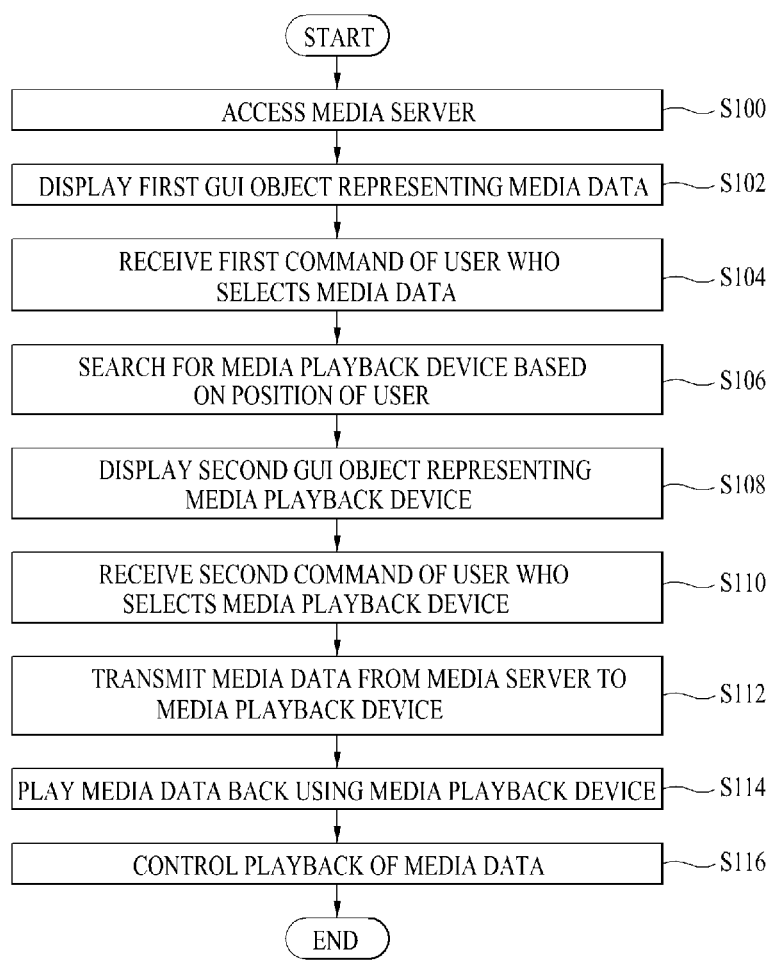
FIG. 2 is a flowchart illustrating a method for controlling streaming of media data according to a first embodiment of the present invention.

Hereinafter, a method of controlling streaming of media data according to the embodiment of the present invention based on the above streaming control system will be described in detail. FIG. 2 is a flowchart illustrating a method of controlling streaming of media data according to a first embodiment of the present invention.

As shown in FIG. 2, the method for controlling streaming of the media data according to the present invention is described. First, the media server 100 that stores media data is accessed (S100). Then, a first GUI object representing the media data is displayed in order for the user to select the media data (S102). Once, a first command from a user selecting the media data through a first GUI object is received (S104), a media playback device which can reproduce the selected media data is searched based on the position of the user (S106). Thereafter, the searched media playback device is displayed as a second GUI object to enable the user to make a selection on the media playback device (S108). After receiving a second command from the user selecting the media playback device through the second GUI object (S110), the media data is reproduced using the media playback device (S114). The detailed description of the present method will be described later.

FIGS. 3 to 6 are schematic diagrams showing a user interface in the method for controlling streaming of media data according to the first embodiment of the present invention. Hereinafter, the above-described steps will be described in greater detail with reference to FIGS. 3 to 6.

First, the streaming control device 300 accesses the media server 100 which stores the media data. The streaming control device 300 may search for and access the media server 100 in the same network using a multicast protocol and request detailed information about the media server 100.

At this time, the media server 100 may transmit information about media data stored therein, information indicating whether the device is a media server 100 or a media playback device, device name information, information indicating whether a Wake On LAN (WOL) is supported, information about the position of the device, information about an output device, information about supported media formats, information about special functions that can be provided to the streaming control device 300. The media server 100 may further transmit additional necessary information to the streaming control device 300.

If searching of the media server 100 is finished, the streaming control device 300 may display the GUI representing a list of media servers 100 to the user. If the user selects a specific media server 100, a file browser for retrieving content information from the media server 100 is connected.

Figure 3:
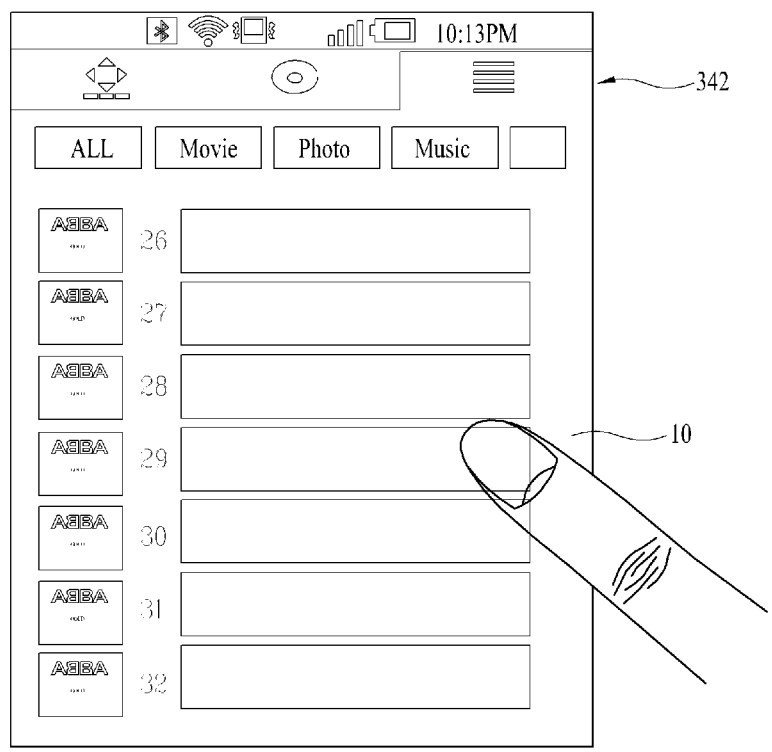
FIGS. 3 to 6 are schematic diagrams showing a user interface in the method for controlling streaming of media data according to the first embodiment of the present invention.

According to a user selection, as shown in FIG. 3, the streaming control device 300 displays a GUI object list 10, which includes a list of media data to be selected, for the user to select a particular media data on a display unit 342 and receives the first command from the user selecting the media data through the displayed GUI object list 10.

For example, the user may touch a first object of the GUI object list 10 for a predetermined time through the touchscreen. At this time, the streaming control device 300 may receive the first command by the user touch gesture.

Figure 4:
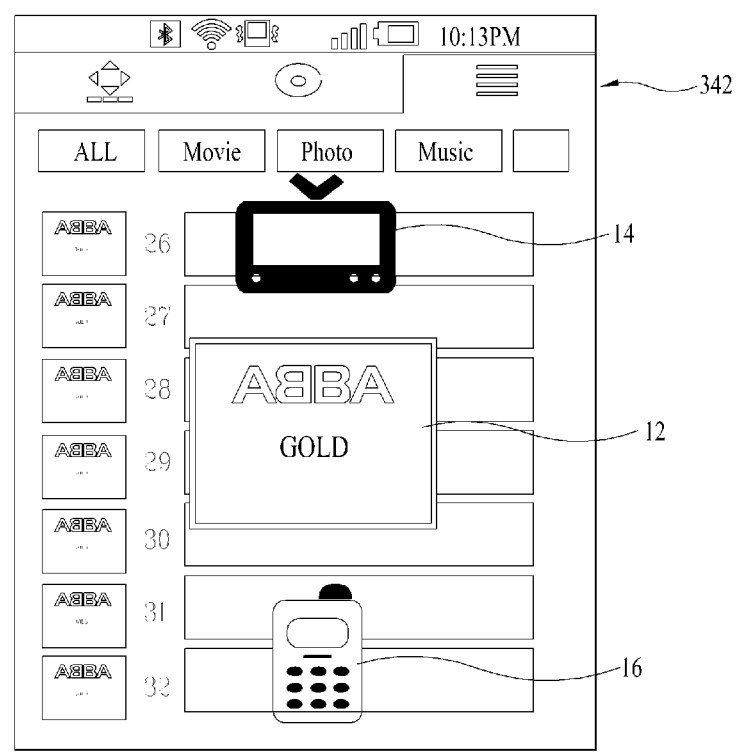

Thereafter, as shown in FIG. 4, the streaming control device 300 displays a first GUI object 12 on the display unit 342 in the form of a thumbnail image according to the first command of the user, searches for a media playback device that is capable of reproducing the media data based on the position of the user, and displays the second GUI object 14 for the user to select the media playback device that can reproduce the media data on the display unit 342. The first GUI object 12 corresponds to the media data to be streamed.

For example, the streaming control device 300 may search and access the media playback device in the same network using the multicast protocol, and request detailed information on the media playback device.

At this time, the media server 100 may transmit information about media data stored therein, information indicating whether the device is a media server 100 or a media playback device, device name information, information indicating whether a Wake On LAN (WOL) is supported, information about the position of the device, information about an output device, information about supported media formats, information about special functions that can be provided to the streaming control device 300. The media server 100 may further transmit additional necessary information to the streaming control device 300.

The streaming control device 300 may determine whether the selected media playback device may reproduce the media data based on the transmitted information about the media playback device. The information includes media formats which the media playback device can support. Then, the streaming control device 300 may display a media playback device which is able to reproduce the selected media data. Further, as shown in FIG. 4, a GUI object 16 representing the streaming control device 300 may further be displayed.

Figure 5:
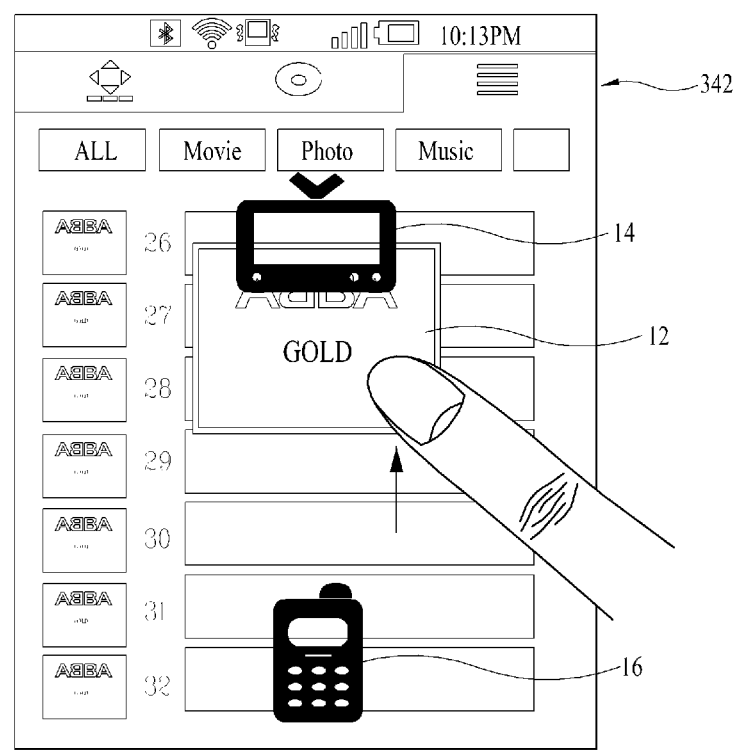

Next, the streaming control device 300 receives the second command from the user selecting the media playback device. For example, as shown in FIG. 5, the user may enter the second command through a touch gesture of dragging and dropping the first GUI object 12 onto the second GUI object 14 representing the media playback device. That is, when the streaming control device 300 receives the second command, the streaming control device 300 performs a control operation for preparing the media playback device to reproduce the media data stored in the media server 100.

Figure 6:
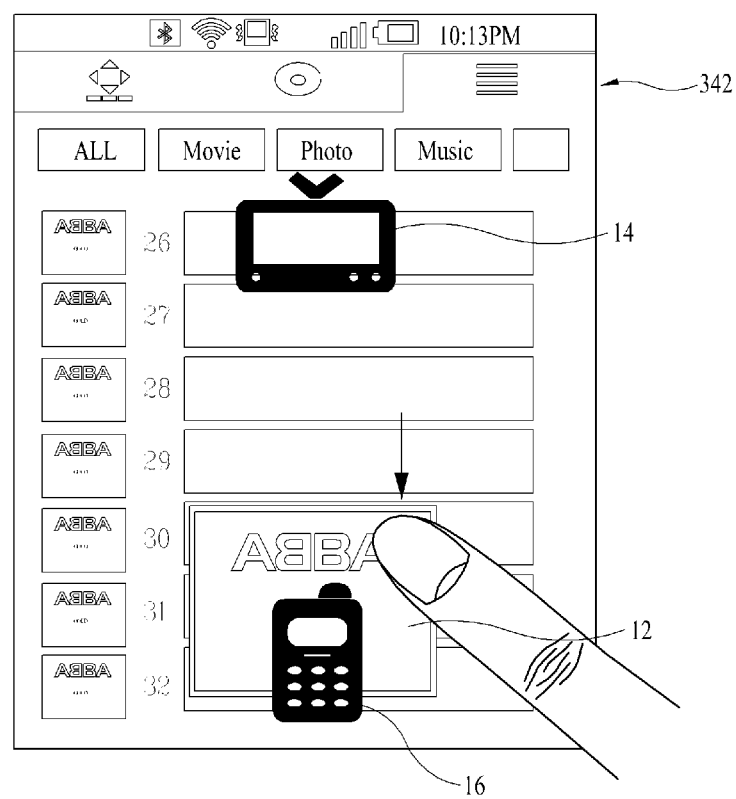

In another example, as shown in FIG. 6, the user may reproduce the media data using the streaming control device 300 by the touch gesture of dragging and dropping the first GUI object 12 onto the GUI object 16 representing the streaming control device 300. At this time, the media data stored in the media server 100 is transmitted to the streaming control device 300 and the streaming control device 300 performs the function of the media playback device.

Therefore, the user can readily perform streaming of content between the media server 100 and the media playback device according to the intuitive UI provided by the above-described streaming control method.

Hereinafter, streaming control methods according to second to ninth embodiments of the present invention will be described in detail with reference to the accompanying drawings. The following streaming control methods are different from the first embodiment in terms of the step of displaying the second GUI object 14 for enabling the user to select the searched media playback device and are similar to the first embodiment in the other steps. Therefore, hereinafter, in the following embodiments, the step of displaying the second GUI object 14 will be described in detail and the description of the other steps will be omitted.

Figure 7:
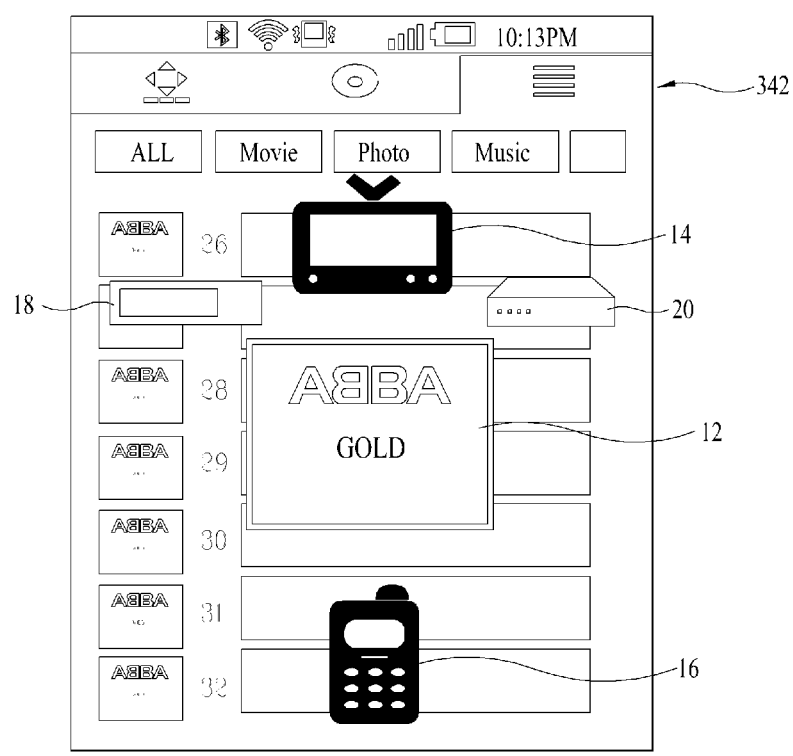
FIGS. 7 and 8 are schematic diagrams showing a user interface in a method for controlling streaming of media data according to a second embodiment of the present invention.
Figure 8:
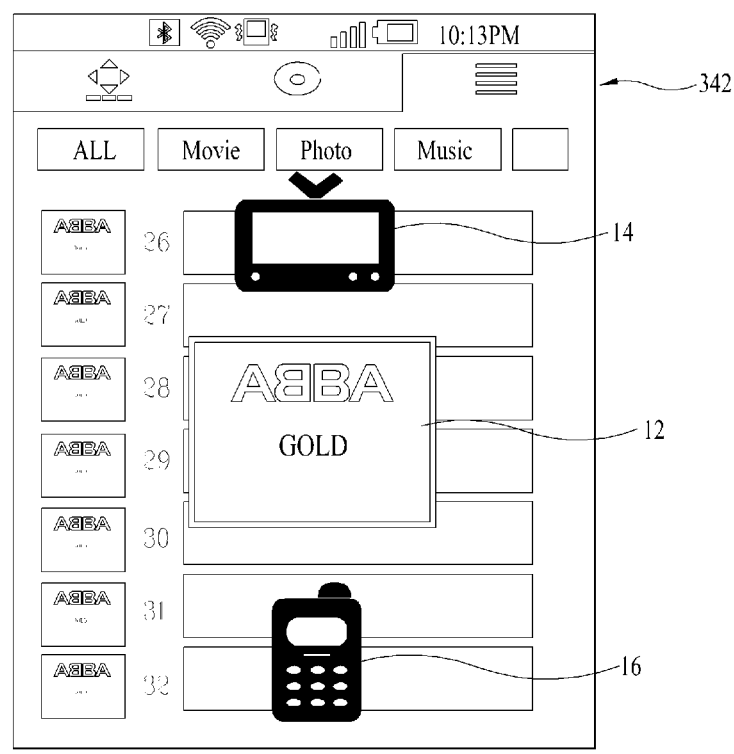

Hereinafter, the streaming control method according to the second embodiment of the present invention will be described in detail with reference to FIGS. 7 and 8. In FIG. 7, a TV 14, a DVD player 18 and a BD player 20 connected to the TV 14 are searched for as the media playback device able to reproduce media data and GUI objects thereof are displayed. The DVD player 18 and the BD player 20 only perform a signal processing such as decoding of the media data. In this case, the TV 14 may be presented to the user as the DVD player 18 and the BD player 20 do not reproduce the actual media data. Therefore, as shown in FIG. 8, only the TV 14 which may reproduce the media data is displayed as a potential media data output device on the display unit 342 of the streaming control device 300 as the second GUI object 14, and the other devices are not displayed.

If the user enters a playback command for the media data through the second GUI object 14 representing the TV, the streaming control device 300 may control a selection of the most suitable playback device among from the TV, the DVD player and the BD player to reproduce the media data. Alternatively, a playback device may be selected according to user input. Information about a connection between the playback devices may be provided when searching for the media playback device.

The user generally pays attention to a device for outputting the media data, rather than a device for processing the media data. Accordingly, in the present embodiment, a UI is provided to the user on the basis of an output device and playback devices are grouped so as to increase user convenience and reduce complexity of UIs due to presence of a plurality of playback devices.

Hereinafter, the streaming control method according to the third embodiment of the present invention will be described with reference to FIGS. 9 and 10. In the present embodiment, a plurality of GUI objects corresponding to a plurality of media playback devices is arranged on the display unit 342 of the streaming control device 300 in correspondence with the relative positions of the plurality of media playback devices. The GUI objects representing the media playback devices are displayed based on the position of the streaming control device 300, that is, the position of the user.

Figure 9:
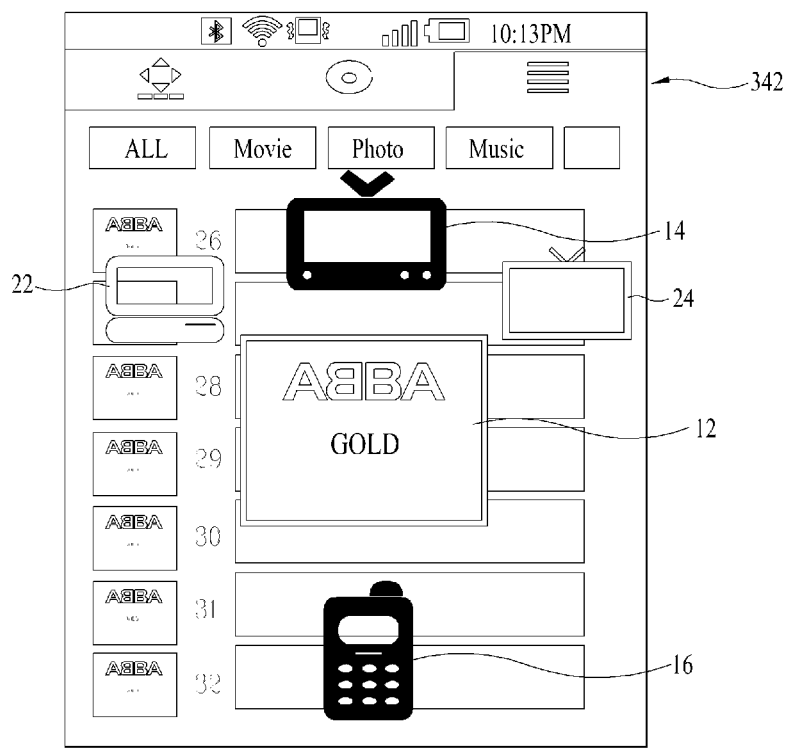
FIGS. 9 and 10 are schematic diagrams showing a user interface in a method for controlling streaming of media data according to a third embodiment of the present invention.

FIG. 9 is a schematic diagram showing the GUI objects representing the media playback devices located in a living room, which are displayed on the display unit 342, if the streaming control device 300 is located in a living room. As described above, the GUI objects are arranged on the display unit 342 in correspondence with the relative positions of the media playback devices. In FIG. 9, a GUI object 14 representing a TV located in front of the streaming control device 300, a GUI object 22 representing a PC located to the left of the streaming control device 300 and a GUI object 24 representing an electric frame located to the right of the streaming control device 300 are displayed on the display unit 342.

At this time, if the streaming control device 300 is moved from the living room to a bedroom, the streaming control device 300 automatically detects the movement of the streaming control device 300 according to patterns of peripheral radio frequency (RF) signals, searches for media playback devices located in the bedroom, and displays GUI objects corresponding to the media playback devices.

Figure 10:
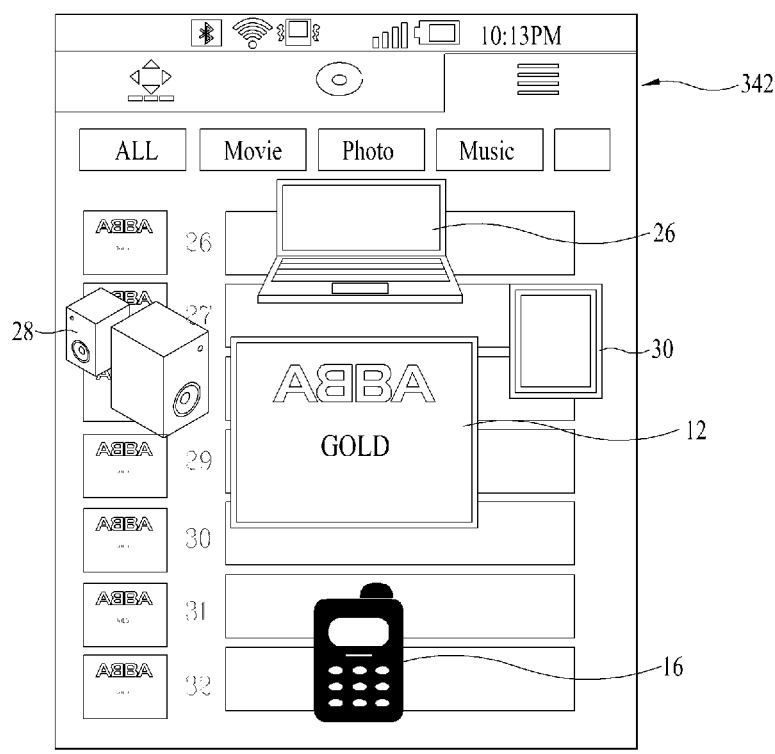

FIG. 10 is a schematic diagram showing the GUI objects representing the media playback devices located in a bedroom if the streaming control device 300 is located in a bedroom. In FIG. 10, a GUI object 26 representing a laptop located in front of the streaming control device 300, a GUI object 28 representing an audio player located to the left of the streaming control device 300 and a GUI object 30 representing a tablet PC located to the right of the streaming control device 300 are displayed on the display unit 342.

By displaying the GUI objects based on the relative positions of the media playback devices, it is possible to provide a more intuitive UI to the user.

Figure 11:
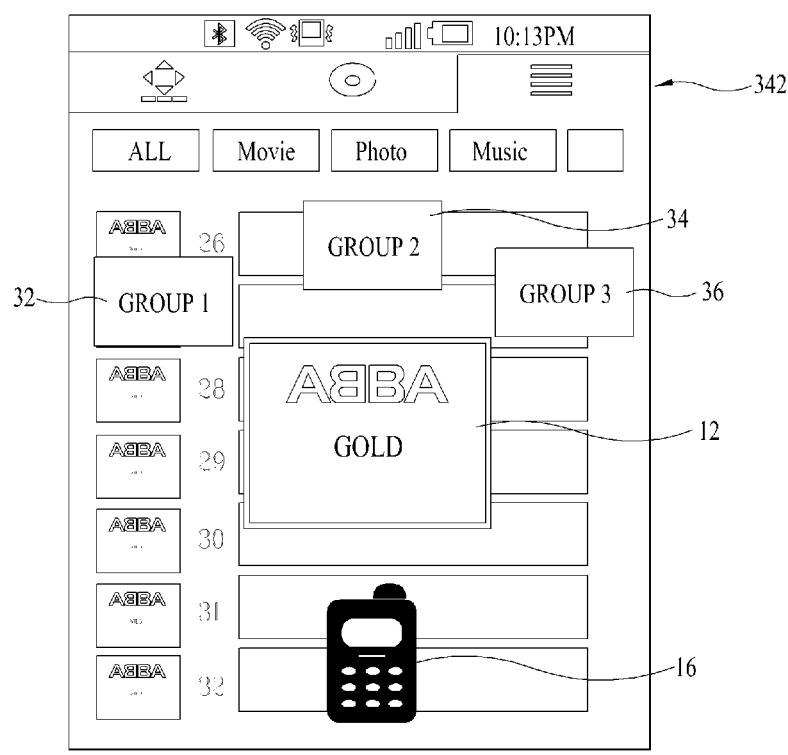
FIG. 11 is a schematic diagram showing a user interface in a method for controlling streaming of media data according to a fourth embodiment of the present invention.

Hereinafter, the streaming control method according to the fourth embodiment of the present invention will be described in detail with reference to FIG. 11. In the present embodiment, the media playback devices are grouped into a plurality of groups defined by the user. The second GUI object representing the media playback device is displayed as a plurality of GUI objects 32, 34 and 36 respectively representing the plurality of groups. The streaming control method according to the present embodiment may be suitably used to stream data between mobile devices.

For example, the user may set media playback devices (e.g., mobile devices) belonging to friends, colleagues and family as respective groups. The GUI objects 32, 34 and 36 corresponding to the respective groups are displayed on the display unit 342 as the second GUI objects 14 representing the media playback devices. Thus, the user can share his/her media data with users of a desired group and reproduce the media data.

Figure 12:
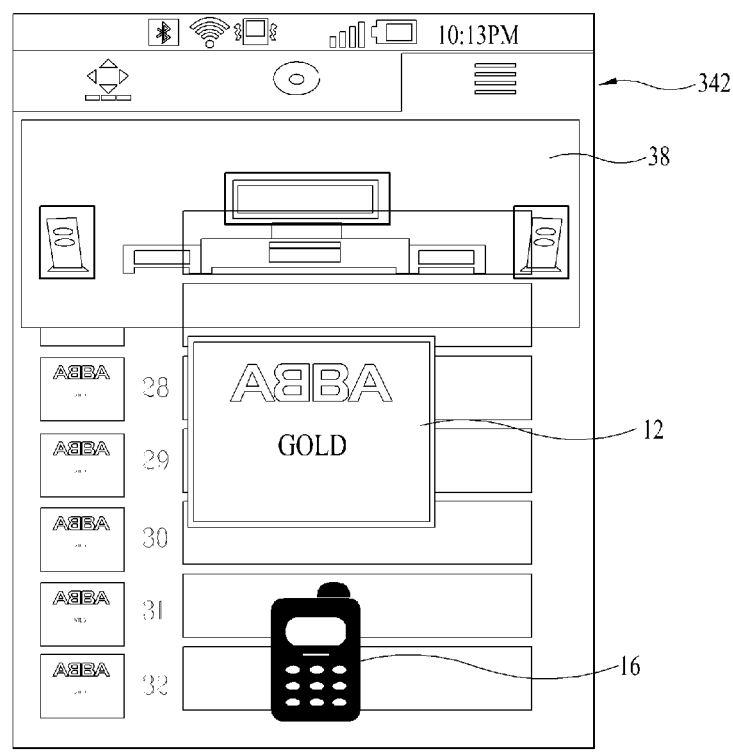
FIG. 12 is a schematic diagram showing a user interface in a method for controlling streaming of media data according to a fifth embodiment of the present invention.

FIG. 12 is a schematic diagram showing a user interface in a streaming control method according to the fifth embodiment of the present invention. Hereinafter, the streaming control method according to the fifth embodiment of the present invention will be described in detail with reference to FIG. 12.

In the present embodiment, the streaming control device 300 identifies media playback devices using images of media playback devices captured by a camera 352 and displays the second GUI objects representing the media playback devices as the images of the identified media playback devices.

For example, if the user sets a mode for identifying the media playback devices using the camera 352, the camera 352 included in the streaming control device 300 is turned on to capture images of the media playback devices in front of the camera. As shown in FIG. 12, an image display window 38 for displaying the image captured by the camera 352 is displayed on the display unit 342 of the streaming control device 300.

The streaming control device 300 identifies the media playback devices based on the positions of the media playback devices and image processing and displays the GUI objects corresponding to the media playback devices to the user through the image display window 38. In this case, as shown in FIG. 12, the GUI objects may be the images of the media playback devices. Using the similar method as the first embodiment, the user can drag and drop the first GUI object 12 representing the media data onto a desired GUI object corresponding to the media playback device and reproduce the media data.

According to the streaming control method of the present embodiment, by displaying the GUI using the captured images of the media playback devices, it is possible to provide a more intuitive UI to the user.

Figure 13:
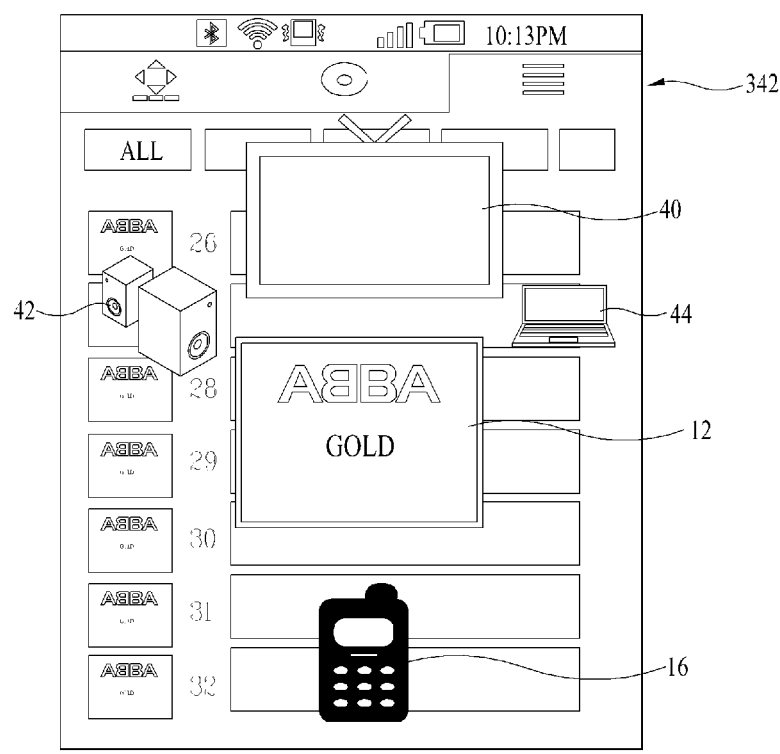
FIG. 13 is a schematic diagram showing a user interface in a method for controlling streaming of media data according to a sixth embodiment of the present invention.

FIG. 13 is a schematic diagram showing a user interface in the streaming control method according to the sixth embodiment of the present invention. Hereinafter, the streaming control method according to the sixth embodiment of the present invention will be described in detail with reference to FIG. 13.

In the present embodiment, a GUI object representing a high-preference or optimal media playback device is highlighted according to a user preference or optimization of the searched media playback devices.

In particular, if the streaming control device 300 is a personal mobile device, a usage history of each user may be stored and the user preference for the media playback device may be determined based on the usage history. Accordingly, if a preference mode is set, it is possible to sequentially highlight GUI objects which are frequently used by the user at the current position.

If the user sets an optimization mode for the media data, it is possible to highlight a GUI object corresponding to a media playback device for optimally playing the media data back. The optimal device may be determined according to the received information about a particular device when searching for the media playback device.

In FIG. 13, the sizes of the GUI objects are differently set according to a preference or optimization. In FIG. 13, the respective sizes of the GUI objects corresponding to a TV 40, an audio player 42 and a laptop computer 44 are sequentially decreased according to the user preference or optimization. In the present embodiment, the GUI objects may be displayed by adjusting the other elements such as a color, a transparency and an arrangement of the GUI objects.

Figure 14:
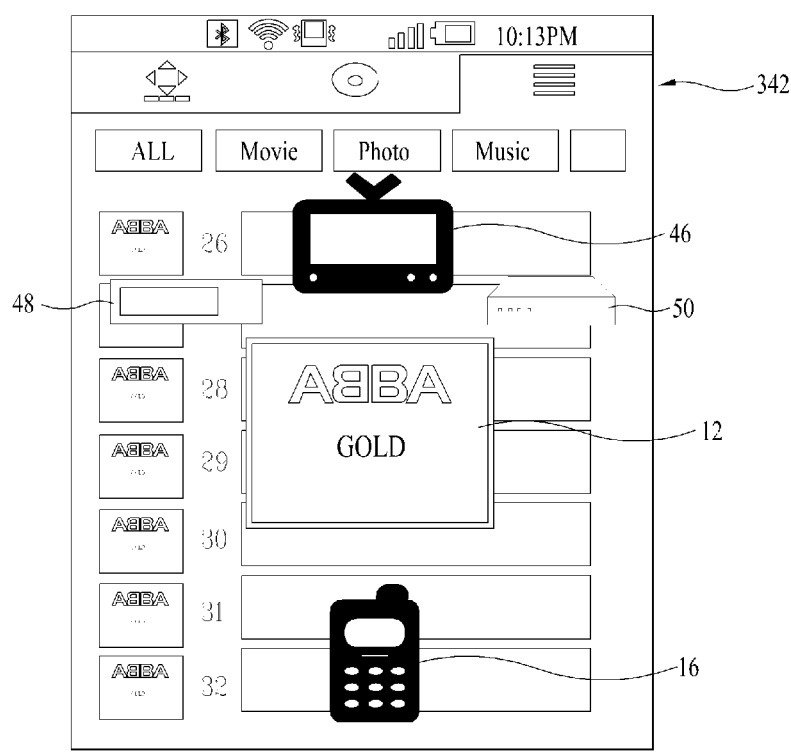
FIGS. 14 and 15 are schematic diagrams showing a user interface in a method for controlling streaming of media data according to a seventh embodiment of the present invention.
Figure 15:
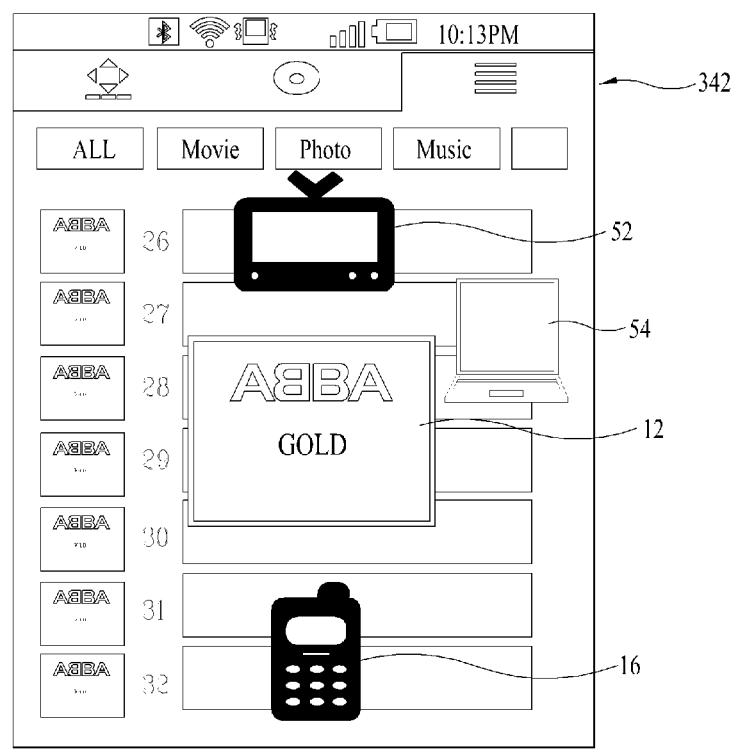

FIGS. 14 and 15 are schematic diagrams showing a user interface in the streaming control method according to the seventh embodiment of the present invention. Hereinafter, the streaming control method according to the seventh embodiment of the present invention will be described in detail with reference to FIGS. 14 and 15.

As described above, when searching for the media playback device, the streaming control device 300 receives information about the device. The information includes file formats that can be supported by the device and whether or not a WOL is supported from the media playback device. Accordingly, as shown in FIG. 14, in the present embodiment, only a GUI object 46 representing a media playback device able to reproduce the currently selected media data may be displayed, and GUI objects 48 and 50 representing the media playback devices unable to reproduce the media data may be blurred or not displayed.

As shown in FIG. 15, in the present embodiment, even when the power of the media playback device is currently off, the GUI object 54 representing the media playback device which can support a WOL may be displayed to the user. If the user enters a playback command of the media data using the powered off media playback device using the same method as the first embodiment, the media playback device may be turned on according to the user command and reproduce the media data.

Figure 16:
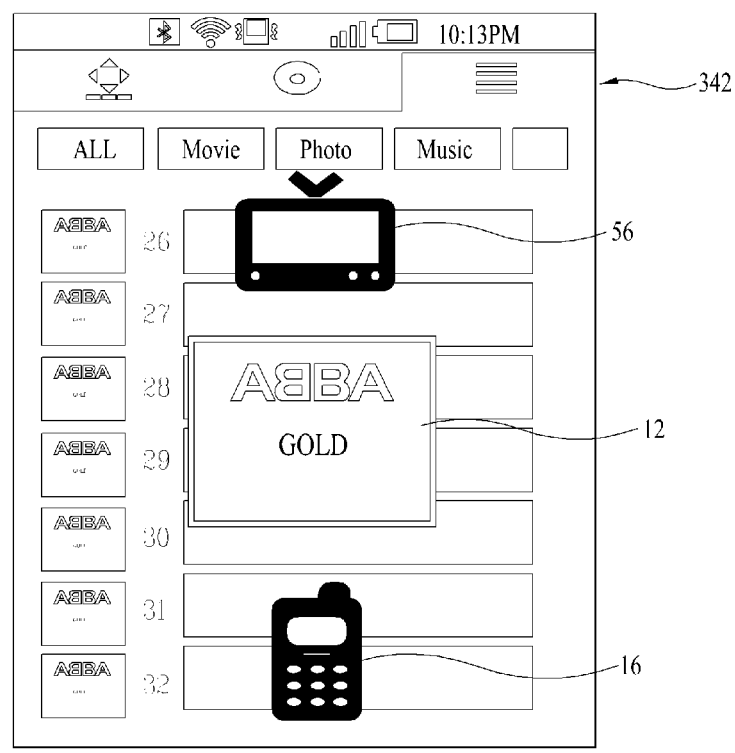
FIGS. 16 and 17 are schematic diagrams showing a user interface in a method for controlling streaming of media data according to an eighth embodiment of the present invention.
Figure 17:
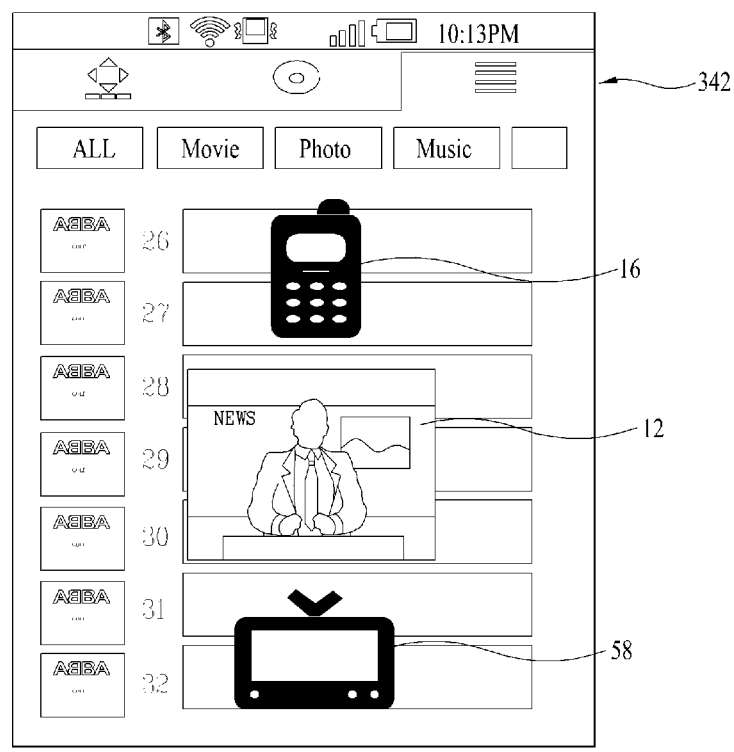

FIGS. 16 and 17 are schematic diagrams showing a user interface in the streaming control method according to the eighth embodiment of the present invention. The streaming control method according to the eighth embodiment of the present invention will be described in detail with reference to FIGS. 16 and 17.

In the present embodiment, the second GUI object 56 is arranged according to the position of the media playback device relative to the user. That is, a direction in which the user currently looks is determined using a sensing unit included in the streaming control device 300 and the position of the media playback devices located around the user is changed in real time according to the direction in which the user looks.

For example, as shown in FIG. 16, if a media playback device is located in front of the user, the second GUI object 56 representing the media playback device is arranged at the upper side of the first GUI object 12 on the display unit 342.

As shown in FIG. 17, if a media playback device is located behind the user, the second GUI object 58 representing the media playback device is arranged at the lower side of the first GUI object 12 on the display unit 342. By such arrangement of the GUI objects, it is possible to provide a more intuitive UI to the user.

Figure 18:
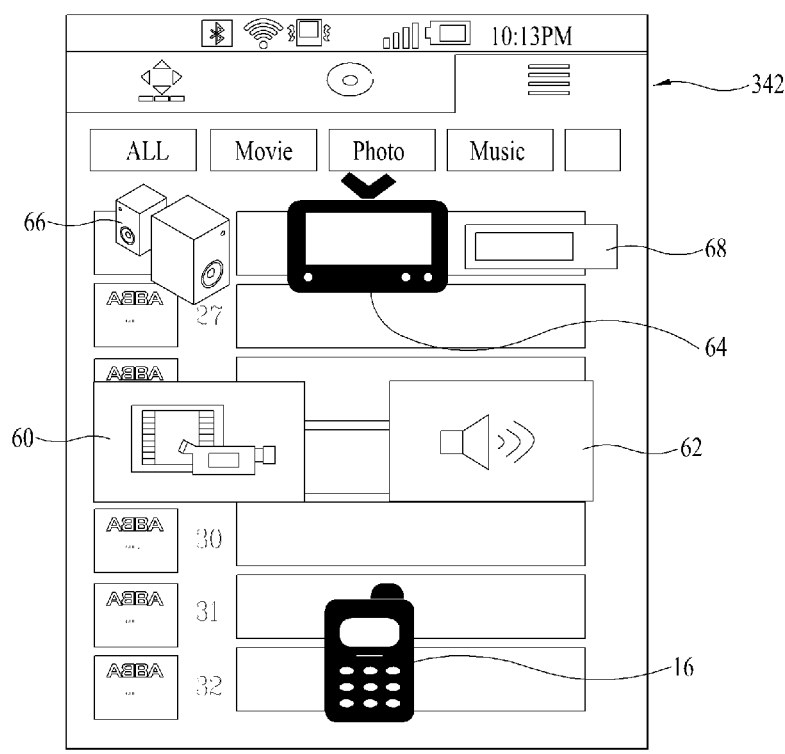
FIGS. 18 and 19 are schematic diagrams showing a user interface in a method for controlling streaming of media data according to a ninth embodiment of the present invention.
Figure 19:
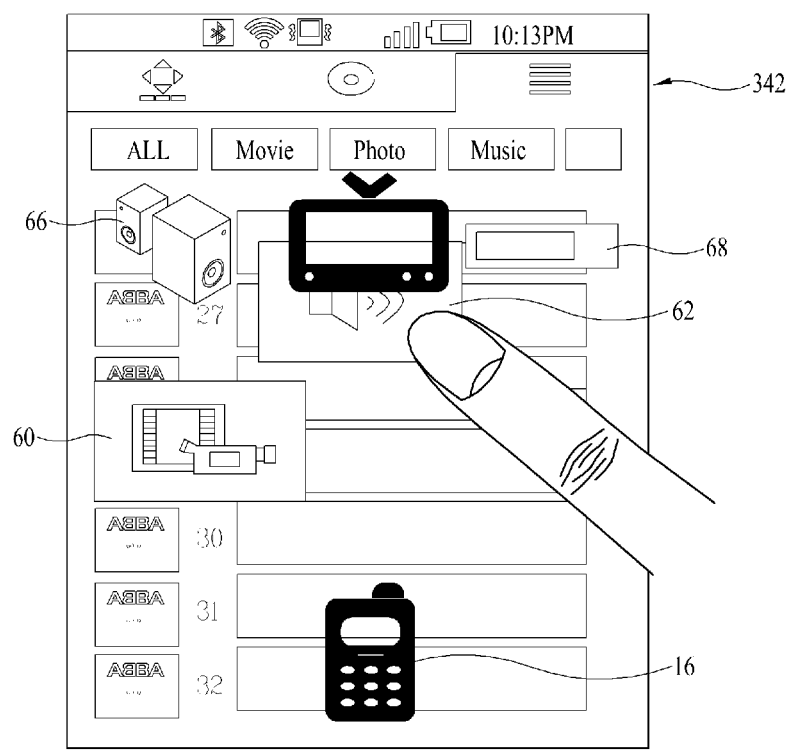

FIGS. 18 and 19 are schematic diagrams showing a user interface in the streaming control method according to the ninth embodiment of the present invention. The streaming control method according to the ninth embodiment of the present invention will be described in detail with reference to FIGS. 18 and 19.

In the present embodiment, a media playback device is divided into a video output device for outputting video data included in media data and an audio output device for outputting audio data included in media data.

If the user wishes to separately output video data and audio data, the user may enter a touch gesture of selecting the media data and enter a separation output command for the selected media data. For example, the user may simultaneously touch the first GUI object 12 representing media data with two fingers and spread the two fingers to enter the separation output command. Alternatively, the user may click the first GUI object 12 and shake the streaming control device 300 as the separation output command.

Through such a user command, as shown in FIG. 18, a video GUI object 60 representing video data and an audio GUI object 62 representing audio data are displayed on the display unit 342 as the first GUI object representing media data.

As shown in FIG. 19, the user may enter a separation output command by dragging and dropping the video GUI object 60 and the audio GUI object 62 onto the GUI objects 64, 66 and 68 representing the video output device and the audio output device.

For example, when viewing a movie, it is possible to separate the media data into the video data and the audio data so that the video data is output to a TV and the audio data is output to a home theater system. Using the UI according to the present embodiment, the user can readily and intuitively separate the video data and the audio data.

Figure 20:
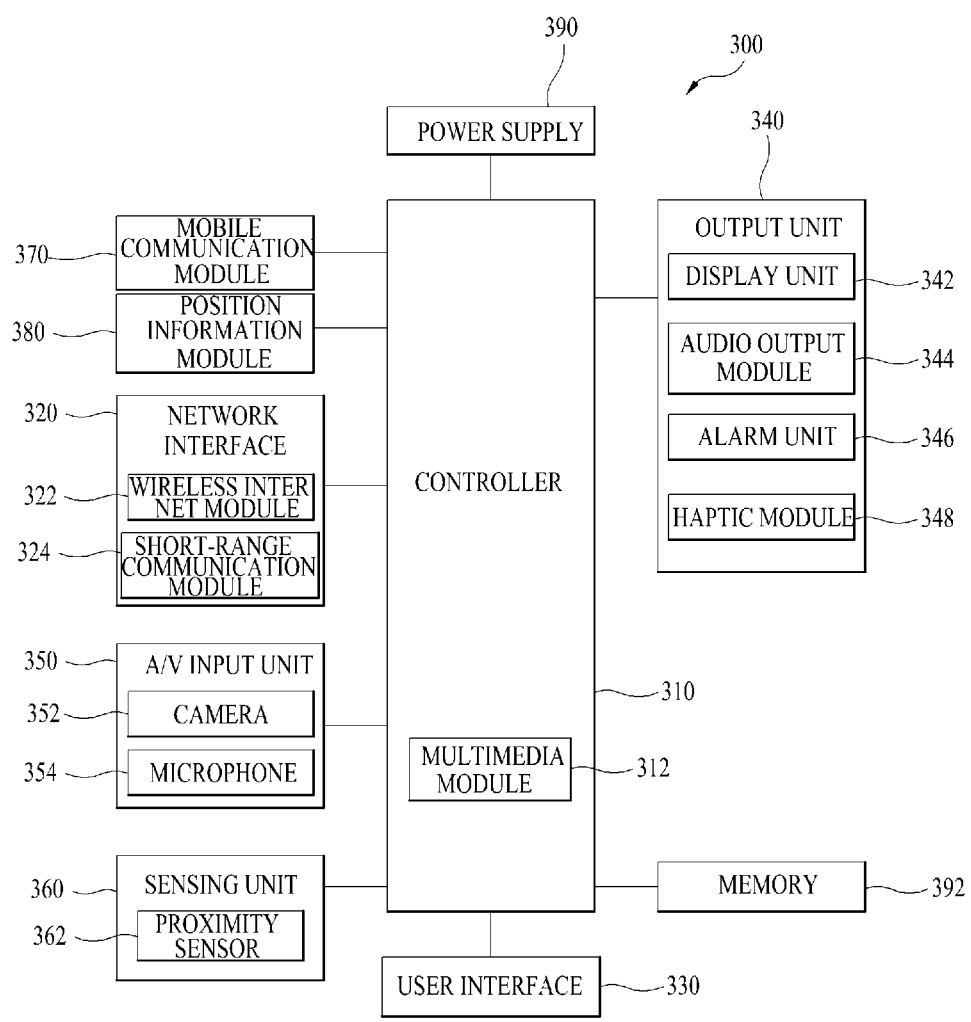
FIG. 20 is a schematic diagram showing a device for controlling streaming of media data according to an embodiment of the present invention.

Hereinafter, the device 300 for controlling streaming of media data according to the embodiment of the present invention will be described. FIG. 20 is a schematic diagram showing a device for controlling streaming of media data according to an embodiment of the present invention As shown, the streaming control device 300 includes a controller 310, a network interface 320, a user interface 330, an output unit 340, an audio/video (A/V) input unit 350, a sensing unit 360, a mobile communication module 370 and a position information module 380. The components included in the streaming control device 300 may be omitted or additional components may be added.

Hereinafter, the components of the streaming control device 300 will be described in detail.

The network interface 320 accesses the media server 100 storing media data and searches for a media playback device able to play media data back according to user position. The network interface 320 may include a wireless Internet module 322 and a short-range communication module 324 to perform the above functions.

The wireless Internet module 322 is an internal or external module for a wireless Internet access which may be provided to the streaming control device 300. For the wireless Internet access, a Wireless Local Area Network (WLAN) (i.e., Wi-Fi), a Wireless Broadband (WiBro), a World Interoperability for Microwave Access (WiMax), a High Speed Downlink Packet Access (HSDPA), a GSM, a CDMA, a WCDMA, and a Long Term Evolution (LTE) (to which the present invention is not limited) may be used.

Since the wireless Internet access using WiBro, HSDPA, GSM, CDMA, WCDMA or LTE is accomplished over a mobile communication network, the wireless Internet module 322 for wireless Internet access over the mobile communication network may be regarded as the mobile communication module 370.

The short-range communication module 324 performs short range communication. For short-range wireless communication, a Bluetooth, a Radio-Frequency IDentification (RFID), an Infrared Data Association (IrDA), an Ultra WideBand (UWB), and a ZigBee may be used.

The output unit 340 is provided to output an audio or video signal or a tactile signal and may include the display unit 342, an audio output module 344, an alarm unit 346 and a haptic module 348.

The display unit 342 displays/outputs information processed by the streaming control device 300. For example, when the streaming control device 300 controls the media server 100 and the media playback device to reproduce media data, the display unit 342 displays a User Interface (UI) or Graphical User Interface (GUI) for reproducing the media data.

That is, the display unit 342 displays the first GUI object 12 for the user to select media data and the second GUI object for the user to select one of the searched media playback devices.

The display unit 342 may include at least one of a liquid crystal display (LCD), an organic light-emitting diode (OLED), and a 3D display.

Two or more display units 342 may be provided according to implementations of the streaming control device 300. For example, a plurality of display units may be separately or integrally provided on one surface of the streaming control device 300 or may be respectively provided on different surfaces of the streaming control device 300.

The audio output module 344 may output audio data received from the network interface 320 or stored in the memory 392. The audio output module 344 may output an audio signal associated with a function performed by the streaming control device 300. The audio output module 344 may include a receiver, a speaker, a buzzer, etc.

The alarm unit 346 outputs a signal notifying the user that an event has occurred in the streaming control device 300. Examples of the event occurring in the streaming control device 300 include a signal reception, a message reception, a key signal input, and a touch input. The alarm unit 346 outputs a signal notifying the user of the occurrence of an event in a different form from the audio or video signal, such as in the form of vibrations. Since the video signal or the audio signal may be output through the display unit 342 or the audio output unit 352, the display unit 342 or the audio output unit 352 may be regarded as the alarm unit 346.

The haptic module 348 generates a variety of tactile effects that the user can feel. A typical example of the tactile effect generated by the haptic module 348 is a vibration. The haptic module 348 may adjust the intensity and patterns of vibration generated by the haptic module 348. For example, the haptic module 348 may combine different vibrations and output the combined vibrations or sequentially output different vibrations.

The user interface 330 generates input data for controlling the operation of the terminal. In particular, the user interface 330 receives a first command of the user selecting media data through the first GUI object 12 and a second command of the user selecting media through the second GUI object 14.

The user interface 330 may include a sensor (hereinafter, referred to as a "touch sensor") for detecting a touch operation so as to configure a touchscreen having a layered structure with the display unit 342. That is, the user interface 330 and the display unit 342 are integrally configured. The touch sensor may be a touch film, a touch sheet or a touch pad.

In this case, the user interface 330 may receive the first command and the second command through a user touch gesture. In particular, the user interface 330 may receive the first command by a user touch gesture of pressing the first GUI object 12 for a predetermined time and receive the second command by a drag-and-drop gesture the first GUI object 12 onto the second GUI object 14.

The touch sensor may be configured to convert a change in pressure applied to a specific portion of the display unit 342 or a change in capacitance generated in a specific portion of the display unit 342 into an electrical input signal. The touch sensor may be configured to detect not only a touch position and area but also a touch pressure.

If a touch input of the touch sensor is detected, a signal(s) corresponding thereto is sent to a touch controller. The touch controller processes the signal(s) and then transmits data corresponding to the processed signal(s) to the controller 310. Thus, the controller 310 may check which portion of the display unit 342 is touched.

The user interface 3230 may further include a keypad, a dome switch, a touchpad (static pressure/static electrical), a jog wheel and a jog switch.

The controller 310 controls the overall operation of the streaming control device 300. The controller 310 controls the media server 100 and the media playback device through the network interface 320 such that the media playback device plays media data back according to the first command and second command received from the user interface 330.

The controller 310 may recognize a user touch gesture performed on the user interface 330 having the touchscreen. The controller 310 may include a multimedia module 312 for multimedia reproduction. The multimedia module 312 may be implemented in the controller 310 or may be implemented separately from the controller 310.

As described above, if the user selects the streaming control device 300 as a media playback device, media data may be received from the media server 100 through the network interface 320, the media data may be reproduced by the multimedia module 312, and the reproduced media data may be output through the display unit 342 and the audio output module.

The A/V input unit 350 inputs an audio signal or a video signal and may include a camera 352 and a microphone 354. The camera 352 processes an image frame such as a still image or a moving image obtained by an image sensor in a video communication mode or an image capture mode. The processed image frame may be displayed on the display unit 342.

An image frame processed by the camera 352 may be stored in the memory 392 or transmitted to an external device through the network interface. Two or more cameras 352 may be included. The camera 352 may capture an image of a media playback device and provide the image to the controller 310.

The microphone 354 receives an external audio signal and processes the audio signal into voice data. If the processed voice data is in a call mode, the processed voice data may be converted into a format transmittable to a mobile communication base station through the mobile communication module 370. The microphone 354 may perform various noise elimination algorithms for eliminating noise occurring when the external audio signal is received.

The mobile communication module 370 transmits or receives an RF signal to or from at least one of a base station, an external terminal and a server over a mobile communication network such as Global System for Mobile communications (GSM), Code Division Multiple Access (CDMA), or Wideband CDMA (WCDMA) (to which the present invention is not limited). The RF signal may include a voice call signal, a video call signal or various types of data associated with a transmission and a reception of a text/multimedia message.

The position information module 380 acquires the position of the streaming control device 300. Representative examples of the position information module 380 include a Global Position System (GPS) module. The GPS module may calculate distance information and accurate time information from three or more satellites and apply a triangulation to the calculated information, thereby accurately calculating current 3-dimensional position information based on latitude, longitude and altitude. A method of calculating position and time information using three satellites and correcting an error of the calculated position and time information using another satellite may be used. In addition, the GPS module may continue to calculate the current position in real time so as to calculate speed information.

The sensing unit 360 detects a current state of the streaming control device 300 such as whether the streaming control device 300 is opened or closed, the position of the streaming control device 300, a user touch state, the orientation of the streaming control device 300 or deceleration/acceleration of the streaming control device 300 and generates a signal for controlling the operation of the streaming control device 300. The sensing unit 360 may include a gyroscope sensor, an acceleration sensor, a geomagnetic sensor, etc.

The sensing unit 360 may detect the position of the streaming control device 300 relative to the media playback device and transmit the position of the streaming control device 300 to the controller 310, and the controller 310 may display the second GUI object 14 representing the media playback device on the display unit 342 based on the position of the streaming control device 300. The sensing unit 360 may also be responsible for sensing functions associated with whether or not the power supply unit 390 is supplying power or whether or not the mobile communication module 370 is coupled to an external device. The sensing unit 360 may include a proximity sensor 362.

The proximity sensor 362 may be disposed near the touchscreen or in an internal region of the streaming control device 300 surrounded by the touchscreen. The proximity sensor can detect the presence or absence of an object that is approaching or near to a predetermined detection surface without physical contact based on electromagnetic force or infrared light. The proximity sensor has a long life span and a wider variety of applications as compared to a contact sensor.

Examples of the proximity sensor 362 include a transmission photoelectric sensor, a direct reflection photoelectric sensor, a mirror reflection photoelectric sensor, a high-frequency oscillation proximity sensor, a capacitive proximity sensor, a magnetic proximity sensor, and an infrared proximity sensor. If the touchscreen is static electrical, the proximity sensor is configured to detect the proximity of the pointer by a change in an electric field according to the proximity of the pointer. In this case, the touchscreen (touch sensor) may be regarded as a proximity sensor.

The proximity sensor 362 detects proximity touch and proximity patterns (e.g., a proximity touch distance, a proximity touch direction, a proximity touch speed, a proximity touch time, a proximity touch position, a proximity touch movement state, etc.). Information corresponding to the detected proximity touch operation and proximity touch pattern may be output on the touchscreen.

The memory 392 may store a program for processing and control of the controller 310 and may temporarily store input or output data (for example, audio, still images, and moving images). The memory 392 may store a use frequency of data (for example, use frequency of each piece of multimedia). The memory 392 may store information about a use frequency of a media playback device and the controller 310 may control the display unit 342 to display the second GUI object 14 based on user preference according to the use frequency of the media playback device.

The memory 392 stores data regarding vibrations and sounds of various patterns output when a touch input of the touchscreen is detected.

The memory 392 may include a storage medium of at least one of a variety of types including a flash memory type, a hard disk type, a multimedia card micro type, a card memory type 392 (for example, SD or XD memory), RAM, Static Random Access Memory (SRAM), Read-Only Memory (ROM), Electrically Erasable Programmable Read-Only Memory (EEPROM), Programmable Read-Only Memory (PROM), magnetic memory 392, magnetic disk, and optical disc. The streaming control device 300 may operate in association with a web storage that performs a storage function of the memory 392 over the Internet.

Under a control of the controller 310, the power supply unit 390 receives external power or internal power and supplies power required for operation to each component.

The various embodiments described herein may be implemented in a recording medium readable by a computer or a similar device thereof using software, hardware or a combination thereof.

In the case of implementing the embodiments of the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), processors, controllers, microcontrollers, microprocessors, etc.

In some cases, the embodiments described in the present specification may be implemented by the controller 310.

In the case of implementing the embodiments of the present invention by software, the procedures or functions of the embodiments described in the present specification may be implemented by separate software modules. Each software module may perform one or more functions or operations described in the present specification.

Software code may be implemented by a software application written in an appropriate program language. The software code may be stored in the memory 392 or may be executed by the controller 310.

Hereinafter, operation of the streaming control device 300 having the above configuration will be described in detail.

The network interface 320 accesses the media server 100 storing media data under control of the controller 310. That is, the network interface 320 may search and access the media server 100 in the same network using a multicast protocol, and request detailed information on the media server 100.

At this time, the media server 100 may transmit information about media data stored therein, information indicating whether the device is a media server 100 or a media playback device, device name information, information indicating whether a Wake On LAN (WOL) is supported, information about the position of the device, information about an output device, information about supported media formats, information about special functions that can be provided to the streaming control device 300. The media server 100 may further transmit additional necessary information to the streaming control device 300.

The memory 392 may store the above information received from the media server 100.

After searching of the media server 100 is finished, the display unit 342 may display the GUI representing a list of media servers 100 to the user, under a control of the controller 310. If the user selects a specific media server 100, a file browser for retrieving content information from the media server 100 is connected.

According to a user selection, as shown in FIG. 3, the display unit 342 displays the first GUI object 12 for the user to select media data and the user interface 330 receives the first command from the user selecting the media data through the displayed first GUI object 12.

For example, the user may touch the first GUI object 12 representing media data to be streamed through the touch-screen of the user interface 330 for a predetermined time.

The controller 310 controls the display unit 342 to display the first GUI object 12 in the form of a thumbnail image according to the first command from the user and controls the network interface 320 to search for a media playback device to reproduce the media data based on the position of the user. According to the search result of the network interface 320, the display unit 342 displays the second GUI object 14 for the user to select the media playback device to reproduce the media data.

For example, the network interface 320 may search and access the media playback device in the same network using the multicast protocol, and request detailed information on the searched media playback device.

At this time, the media playback device may transmit information indicating whether the device is a media server 100 or a media playback device, device name information, information indicating whether a Wake On LAN (WOL) is supported, information about the position of the device, information about an output device, information about supported media formats, information about special functions that can be provided to the streaming control device 300. The media server 100 may further transmit additional necessary information to the streaming control device 300.

The memory 392 may store the above information received from the media playback device.

The controller 310 may determine whether the media playback device may reproduce the media data selected by the user from the information about the media playback device, such as the information about the supported media formats, and control the display unit 342 to display a media playback device which can reproduce the selected media data. At this time, as shown in FIG. 4, the display unit 342 may further display the GUI object 16 representing the streaming control device 300.

The user interface 330 receives the second command from the user selecting the media playback device through the second GUI object 14. For example, as shown in FIG. 5, the user may enter the second command to the user interface 330 by dragging and dropping the first GUI object 12 onto the media playback device.

According to the second command received through the user interface 330, the controller 310 transmits a control command for the media playback device to reproduce the media data stored in the media server 100 to the media server 100 and the media playback device through the network interface 320.

The media data stored in the media server 100 is transmitted to the media playback device and the transmitted media data is played back by the media playback device. If the media server 100 and the media playback device are implemented as one device, the device plays the media data back without transmission.

As shown in FIG. 6, the user may reproduce the media data using the streaming control device 300 by a drag-and-drop gesture the first GUI object 12 onto the GUI object 16 representing the streaming control device 300. The first GUI object 12 is represented as a thumbnail image.

In FIG. 7, the TV 14, the DVD player 18 and the BD player 20 connected to the TV 14 are searched for as the media playback device able to reproduce media data. The DVD player 18 and the BD player 20 only perform a signal processing such as decoding of media data, and actual media data may be output only through the TV 14 and may be presented to the user. At this time, as shown in FIG. 8, the display unit 342 may display only the TV 14 which is the actual output device as the second GUI object 14 and may not display the other devices.

At this time, if the user interface 330 receives a user playback command for the media data through the second GUI object 14, the controller 310 may select the most suitable playback device among from the TV 14, the DVD player 18 and the BD player 20 to play media data back. Alternatively, the controller 310 may select a playback device according to a user input. Information about a connection between the playback devices may be provided when searching for the media playback device.

The user generally pays attention to a device for outputting the media data, rather than a device for processing the media data. Accordingly, an output device is provided to the user as a UI and playback devices are grouped so as to increase user convenience and reduce complexity of UIs due to presence of a plurality of playback devices.

The display unit 342 may arrange a plurality of GUI objects corresponding to a plurality of media playback devices in correspondence with the relative positions of the plurality of media playback devices. The display unit 342 may display GUI objects representing the media playback devices based on the position of the streaming control device 300, that is, the position of the user.

FIG. 9 is a schematic diagram showing the GUI objects representing the media playback devices located in a living room, which are displayed on the display unit 342, if the streaming control device 300 is located in a living room. As described above, the controller 310 may control the display unit 342 to display the GUI objects in correspondence with the relative positions of the media playback devices. In FIG. 9, a GUI object representing a TV located in front of the streaming control device 300, a GUI object 22 representing a PC located to the left of the streaming control device 300 and a GUI object 24 representing an electric frame located to the right of the streaming control device 300 are displayed on the display unit 342.

At this time, if the streaming control device 300 is moved from the living room to a bedroom, the controller 310 of the streaming control device 300 automatically detects the movement of the streaming control device 300 according to patterns of peripheral radio frequency (RF) signals, searches for media playback devices located in the bedroom, and controls the display unit 342 to display GUI objects corresponding thereto.

FIG. 10 is a schematic diagram showing the GUI objects representing the media playback devices located in a bedroom, which are displayed on the display unit 342, if the streaming control device 300 is located in a bedroom. In FIG. 10, a GUI object 26 representing a laptop located in front of the streaming control device 300, a GUI object 28 representing an audio player located to the left of the streaming control device 300 and a GUI object 30 representing a tablet PC located to the right of the streaming control device 300 are displayed on the display unit 342.

The media playback devices are grouped into a plurality of groups defined by the user. The display unit 342 may display the second GUI object 14 representing the media playback device as a plurality of GUI objects respectively representing the plurality of groups.

For example, the user may set friends, colleagues and family as respective groups. The controller 310 may control the display unit 342 to display GUI objects corresponding to the respective groups as the second GUI object 14 representing the media playback device. Therefore, the user can share his/her own media data with users of a desired group.

The streaming control device 300 may identify media playback devices using images of media playback devices captured by a camera 352 and display the second GUI object 14 representing the media playback device as images of the identified media playback devices.

For example, if the user sets a mode for identifying the media playback device using the camera 352, the controller 310 turns on the camera 352 to capture images of the media playback devices in front of the camera when selecting a media playback device, as shown in FIG. 12. At this time, the display unit 342 may display the image captured by the camera 352 in an image display window 38.

The controller 310 identifies the media playback devices based on the positions of the media playback devices and image processing and the display unit 342 displays the GUI objects corresponding thereto through the image display window 38. In this case, as shown in FIG. 12, the GUI objects may be the images of the media playback devices. Using a method similar to the first embodiment, the user can drag and drop the first GUI object 12 representing the media data onto the GUI object corresponding to the media playback device and reproduce the media data.

According to the streaming control method of the present embodiment, by displaying the GUI using the images of the media playback devices, it is possible to provide a more intuitive UI to the user.

The controller 310 may control the display unit 342 to display a GUI object representing a high-preference or optimal media playback device to be highlighted according to a user preference or optimization of the searched media playback devices.

In particular, if the streaming control device 300 is a personal mobile device, a usage history of each user may be stored in the memory 392 and the controller 310 may determine a user preference for the media playback device based on the usage history. Accordingly, if the user sets a preference mode, the display unit 342 displays the GUI objects which are frequently used by the user at the current position to be sequentially highlighted. If the user sets an optimization mode for media data, the display unit 342 displays a GUI object corresponding to a media playback device for optimally playing the media data back to be highlighted. The controller 310 may determine an optimal device according to information about a device received when searching for the media playback device.

In FIG. 13, the sizes of the GUI objects are differently set according to a preference or optimization. In FIG. 13, the respective sizes of the GUI objects corresponding to a TV 40, an audio player 42 and a laptop computer 44 are sequentially decreased according to the user preference or optimization. In the present embodiment, the GUI objects may be displayed by adjusting the other elements such as a color, a transparency and an arrangement of the GUI objects.

As described above, when searching for the media playback device, the network interface 320 may receive information about supported file formats and information indicating whether a WOL is supported from the media playback device as information about the device and store the information in the memory 392. Accordingly, as shown in FIG. 14, the controller 310 may control the display unit 342 to display only a GUI object representing a media playback device able to play the currently selected media data back.

As shown in FIG. 15, the display unit 342 may display the GUI object representing the media playback device which can support WOL to the user, even when the power of the media playback device is currently off. If the user enters a playback command of media data using the media playback device, the user command is provided to the media playback device through the network interface 320, the media playback device is turned on, and the media data is played back by the media playback device.

The controller 310 may control the display unit 342 to arrange the second GUI object 14 according to the position of the media playback device relative to the user. At this time, the controller 310 determines a direction in which the user currently looks through a sensing unit included in the streaming control device 300 and changes the position of the media playback device located around the user in real time according to the direction in which the user looks.

For example, as shown in FIG. 16, if a media playback device is located in front of the user, the display unit 342 arranges the second GUI object 14 representing the media playback device at the upper side of the first GUI object 12 on the display unit 342. As shown in FIG. 17, if a media playback device is located behind the user, the display unit 342 arranges the second GUI object 14 representing the media playback device at the lower side of the first GUI object 12 on the display unit 342. By such an arrangement of the GUI objects, it is possible to provide a more intuitive UI to the user.

A media playback device may be divided into a video output device for outputting video data included in the media data and an audio output device for outputting audio data included in the media data.

If the user wishes to separately output video data and audio data, the user may enter a touch gesture of selecting media data and enter a separation output command of the selected media data. For example, the user may simultaneously touch the first GUI object 12 representing media data with two fingers and spread the two fingers enter the separation output command. Alternatively, the user may click the first GUI object 12 and shake the streaming control device 300 as the separation output command.

Through such a user command, as shown in FIG. 18, the display unit 342 displays a video GUI object 60 representing video data and an audio GUI object 62 representing audio data as the first GUI object representing media data.

As shown in FIG. 19, the user may enter a separation output command to the user interface 330 by a drag-and-drop gesture the video GUI object 60 and the audio GUI object 62 onto the GUI objects 64, 66 and 68 representing the video output device and the audio output device.

For example, when viewing a movie, it is possible to separate the media data into the video data and the audio data so that the video data is output to a TV and the audio data is output to a home theater system. Using the UI according to the present embodiment, the user can readily and intuitively separate the video data and the audio data.

According to the streaming control method and device of the present invention, it is possible to provide more intuitive UN for a media server and media playback devices so as to enable a user to more readily and conveniently perform streaming between devices.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of controlling streaming media data using a streaming control device, the method comprising:
   accessing, via the streaming control device, a plurality of media data stored in a media server;
   displaying, via a touchscreen of the streaming control device, a first object including the plurality of media data, wherein each of the plurality of media data corresponds to audio/video (AV) data;
   receiving a first command selecting a particular media data among the plurality of media data from the first object, wherein the first command is a touch gesture for selecting a second object corresponding to the particular media data included in the first object, further the plurality of media data is not downloaded into any media playback devices;
   searching for media playback devices to reproduce the particular media data based on a position of the streaming control device;
   displaying, via the touchscreen, a third object for representing the searched media playback devices, wherein the third object is displayed in a specific region depending on a positional relationship between the searched media playback devices and the streaming control device, further the third object is comprised of multiple GUI objects including a first GUI object representing that one of the searched media playback devices corresponds to a video output device and a second GUI object representing that one of the searched media playback devices corresponds to an audio output device;
   receiving a second command selecting a particular media playback device among the searched media playback devices from the third object;
   separating the particular media data into video data and audio data so that the video data is outputted to the video output device and the audio data is outputted to the audio output device,
   wherein the separating further comprises:
      entering a separation output command for the particular media data, wherein the separation output command enters if a user simultaneously touches the second object corresponding to the particular media data with two fingers and spreads the two fingers or the user clicks the second object and shakes the streaming control device;
      displaying a video GUI object representing video data and an audio GUI object representing audio data in response to the separation output command; and
      recognizing a first drag-and-drop gesture moving the video GUI object onto the first GUI object and a second drag-and-drop gesture moving the audio GUI object onto the second GUI object; and
   controlling each of the video output device and the audio output device to reproduce the particular media data, wherein the video output device and the audio output device are positioned out of the streaming control device.

2. The method according to claim 1, wherein the first command and the second command are touch gestures on the touchscreen.

3. The method according to claim 2, wherein the second command is a drag-and-drop gesture for moving the second object onto the third object, and the second object is included in the first object and corresponds to the particular media data.

4. The method according to claim 1, wherein the particular media playback device includes a media data processing device configured to process data included in particular the media data and a media output device configured to display the data processed by the media data processing device.

5. The method according to claim 1, wherein the multiple GUI objects of the third object are arranged and displayed on the touchscreen based on relative positions of the media playback devices in connection with the position of the streaming control device.

6. The method according to claim 1, wherein the particular media playback device includes a video output device for outputting video data included in the particular media data and an audio output device for outputting audio data included in the particular media data,
   the second object includes a video data object representing the video data and an audio data object representing the audio data, and the video data object and the audio data object are displayed on the touchscreen, and
   the second command includes a command for outputting the video data to the video output device and the audio data to the audio output device, and the second command is received through the video data object and the audio data object.

7. The method according to claim 1, wherein the third object is displayed according to a position of the particular media playback device.

8. The method according to claim 1, wherein the media playback devices are grouped into a plurality of groups defined by a user, and
   a plurality of objects of the third object respectively representing the plurality of groups are displayed on the touchscreen.

9. The method according to claim 1, wherein the searching for the media playback devices includes identifying the media playback devices by respective images of the media playback devices captured by a camera, and
the displayed third object includes the respective images of identified media playback devices.

10. The method according to claim 1, wherein the positional relationship is determined by a camera of the streaming control device.

* * * * *